Patented May 29, 1945

2,377,092

UNITED STATES PATENT OFFICE 2,377,092

CONVERSION OF HYDROCARBON OILS

Edwin H. McGrew, Chicago, Ill., assignor to Universal Oil Products Company, Chicago, Ill., a corporation of Delaware No Drawing. Application October 19, 1940,
Serial No. 361,890

13 Claims. (Cl. 196—52)

This invention relates to the catalytic conversion of hydrocarbon oil fractions produced from petroleum and may be applied either to the production of gasoline boiling range materials from relatively heavy fractions containing substantially no gasoline or to the reforming of gasoline boiling range fractions to increase their antiknock value.

The invention is more specifically concerned with the use of selected catalysts which have been found to be particularly valuable in accelerating cracking or reforming reactions, these catalysts being of a relatively inexpensive character and readily manufactured by simple methods of mixing raw materials entering into their composition.

It is recognized that there is considerable art extant on the use of catalysts to direct and accelerate hydrocarbon conversion reactions such as those involved in cracking and reforming petroleum fractions. The specifications which catalytic materials must meet if they are to be commercially applicable are fairly well known and include cheapness, ready availability, ease of manufacture, selectively in fostering the desired reactions, low carbon-forming propensities, and easy reactivity after hydrocarbonaceous deposits have formed after a period of service. In general also cracking catalysts must favor carbon-to-carbon splitting rather than too extensive dehydrogenation reactions. Without extensively recounting materials which have been proposed for hydrocarbon conversion catalysts, it may be sufficient to indicate that numerous natural and artificial materials have been proposed which include clays and other natural and other artificial silicates, metals such as nickel and both metal oxides and sulfides. The present process is more particularly related to the use of siliceous materials such as natural clays as base materials for the formation of the preferred catalysts.

In one specific embodiment the present invention comprises a process for the conversion of hydrocarbons which consists in subjecting the vapors of said hydrocarbons at elevated temperatures to contact with granular catalytic materials consisting of clays activated by relatively minor amounts of phosphoric acids.

The catalysts which characterize the present invention consist in general of clay-like materials which have been impregnated with phosphoric acids in amounts of less than 1% by weight of the clay, it having been found that for each clay-like substance, there is practically always an optimum percentage of phosphoric acid which corresponds to maximum increased activity of the clay as a hydrocarbon conversion catalyst. As a rule, the amounts of the promoting substances are less than 1% by weight of the total composites, although in some instances higher percentages may be used. The increase in catalytic activity due to the incorporation of phosphoric acid with clay catalysts was unexpected and forms the principal feature of the present invention.

In making up catalysts which are to be used in the present process, the simplest procedure is to mix granular prepared clay-like materials which may include minerals, e. g., of the group including halloysite, pyro-phyllite and montmorillonite with the required small amounts of a phosphoric acid promoter and use the thoroughly mixed materials directly. If desired, the clay-like substances may be calcined prior to the incorporation of the promoters to drive out a certain amount of the water content when this is found to be beneficial or they may be treated with mineral acids to remove a portion of the free and combined bases and form an activated support such as are typified by materials having the trade name "Tonsil," "Filtrol," and other materials which are used as filtering, adsorbent, or catalytic substances. Similarly synthetic silicates having the proper physical properties prepared by either wet or fusion methods can be improved in their hydrocarbon converting activity by the addition of the promoters mentioned. While a large number of alternative catalysts are thus producible, it is obviously not to be inferred that they are exactly equivalent in their activities since some may be better suited to cracking and others to reforming reactions and their efficiency may also vary when applied to petroleum stocks from different crude-producing areas. As a further alternative mode of catalyst preparation, powdered clay-like materials may be impregnated with the required small amounts of phosphoric acid and used in slurry form or pilled to be used in stationary beds or chambers. The pilling of the clay-like substances may precede the impregnation of the promoters if desired.

Any of the usual methods of operation when employing cracking or reforming catalysts may be followed when using the catalysts of the present invention. Ordinarily the simplest procedure is to employ a bed or beds of granular prepared catalyst through which the vapors of the hydrocarbon fractions to be converted are passed at temperatures, pressures, and rates adequate to effect the desired conversions. When cracking heavier distillates to produce gasoline, the preferred temperatures are from about 850 to 1000° F. although they may be varied from about 800 to 1200° F. Similarly pressures may vary from atmospheric to as high as 500 lbs. per sq. in. or higher although the preferred pressures are usually of the order of 50-150 lbs./sq. in. The optimum rates of flow of the vapors over the catalyst vary considerably with different stocks treated and are usually best determined by experiment.

Another mode of operation which may be employed with the preferred catalyst is to suspend finely divided powdered catalyst in a stream of oil passing through a heating zone to effect the catalytic conversion reactions, followed by separation and recovery of the catalyst in residuum from primary fractionation of the cracked products after which the desired fractions are recovered and insufficiently converted materials are recycled.

In making up the catalyst, the simplest mode of procedure is to utilize ortho-phosphoric acid for the impregnation, although pyro-phosphoric acid may be alternatively employed.

The following examples are given of the results obtained in cracking with catalysts characteristic of the present invention, although not with the intention of limiting the scope of the invention in exact correspondence with the data presented.

*Example I*

The following tabulation shows the gasoline yields produced when adding different amounts of phosphoric acid to a commercial clay marketed under the trade name of "Tonsil" which was an acid-treated material.

| Catalyst | Tonsil without promoter | 0.187% $H_3PO_4$ | 0.375% $H_3PO_4$ | 1% $H_3PO_4$ | 1.5% $H_3PO_4$ |
|---|---|---|---|---|---|
| Gasoline yield | Per cent 27.2 | 30 | 28.5 | 27.3 | 28.6 |

The above data show that the addition of the smallest amount of phosphoric acid gave the greatest increase in gasoline yield while the addition of 1% or over had no effect on the cracking efficiency of the catalyst.

*Example II*

Another series of runs was made with a commercial filtering material having the trade name "Filtrol" which was a different type of acid-treated clay, with the following results:

| Catalyst | Filtrol without promoter | 0.187% $H_3PO_4$ | 0.375% $H_3PO_4$ | 1% $H_3PO_4$ | 1.5% $H_3PO_4$ |
|---|---|---|---|---|---|
| Gasoline yield | 26.0 | 30 | 28 | 26 | 26.4 |

As in the first example it is seen from the above data that there is a marked increase in the amount of gasoline produced when the smallest amount of phosphoric acid is incorporated in the clay, while the incorporation of 1% or more caused a reversion of the catalyst activity back to that of the original material without any promoting effect.

*Example III*

Runs were made on a Pennsylvania gas oil in a continuous apparatus at a temperature of 932° F. and at atmospheric pressure using a liquid space velocity of 8. The material to which phosphoric acid was added to increase its catalytic activity was a synthetically prepared silica-alumina-zirconia composite and the following tabulation of data shows the results obtained with the material before and after the addition of 0.2% ortho-phosphoric acid.

| Sample | Wt. percent gas | Wt. percent gasoline | Wt. percent conversion | Activity rating |
|---|---|---|---|---|
| Blank | 9.9 | 20.2 | 30.2 | 84 |
| +0.2% $H_3PO_4$ | 9.8 | 21.2 | 31.4 | 92 |
| +0.2% $H_3PO_4$ | 9.7 | 21.9 | 32.1 | 97 |

The activity rating is given in terms of the percentage yield of gasoline compared with the yield obtained under similar conditions with a cracking catalyst not containing phosphoric acid. It is to be noted that the addition of the phosphoric acid made a very definite increase in the once-through yield of gasoline.

I claim as my invention:

1. A process for the conversion of a petroleum distillate containing substantially no gasoline into substantial yields of gasoline boiling range material which comprises contacting vapors of said distillate with a catalyst consisting of an acid-treated clay activated by a phosphoric acid in the amount of less than 1% by weight of said clay.

2. A process for the conversion of a petroleum distillate containing substantially no gasoline into substantial yields of gasoline boiling range material which comprises contacting vapors of said distillate with a catalyst consisting of an acid-treated clay activated by ortho-phosphoric acid in the amount of less than 1% by weight of said clay.

3. A process for the conversion of a petroleum distillate containing substantially no gasoline into substantial yields of gasoline boiling range material which comprises contacting vapors of said distillate with a catalyst consisting of an acid-treated clay activated by pyro-phosphoric acid in the amount of less than 1% by weight of said clay.

4. A process for producing gasoline of high anti-knock value which comprises contacting hydrocarbon oil at catalytic conversion temperature of from about 800° F. to about 1200° F. with a clay catalyst containing a relatively small but sufficient amount of a phosphoric acid to increase the activity of the catalyst.

5. A process for producing gasoline which comprises subjecting hydrocarbon oil heavier than gasoline to cracking conditions in the presence of a clay catalyst containing a relatively small but sufficient amount of a phosphoric acid to increase the activity of the catalyst.

6. A process for increasing the anti-knock value of gasoline fractions which comprises subjecting the same to reforming conditions in the presence of a clay catalyst containing a relatively small but sufficient amount of a phosphoric acid to increase the activity of the catalyst.

7. A conversion process which comprises subjecting hydrocarbon oil to cracking conditions in the presence of a cracking catalyst comprising silica and alumina containing a relatively small but sufficient amount of a phosphoric acid to increase the activity of the catalyst.

8. A process for producing gasoline of high anti-knock value which comprises contacting hydrocarbon oil at catalytic conversion temperature of from about 800° F. to about 1200° F. with an acid-treated clay containing a relatively small but sufficient amount of a phosphoric acid to increase the catalytic activity of the acid-treated clay.

9. A process for producing gasoline which comprises subjecting hydrocarbon oil heavier than gasoline to cracking conditions in the presence of an acid-treated clay containing a relatively small but sufficient amount of a phosphoric acid to increase the catalytic activity of the acid-treated clay.

10. A process for increasing the anti-knock value of gasoline fractions which comprises subjecting the same to reforming conditions in the presence of an acid-treated clay containing a relatively small but sufficient amount of a phosphoric acid to increase the catalytic activity of the acid-treated clay.

11. A process for producing gasoline of high anti-knock value which comprises contacting hydrocarbon oil at catalytic conversion temperature of from about 800° F. to about 1200° F. with a clay catalyst activated with a relatively small but sufficient amount of a phosphoric acid to increase the activity of the catalyst.

12. A process for producing gasoline which comprises subjecting hydrocarbon oil heavier than gasoline to cracking conditions in the presence of a clay catalyst activated with a relatively small but sufficient amount of a phosphoric acid to increase the activity of the catalyst.

13. A process for increasing the anti-knock value of gasoline fractions which comprises subjecting the same to reforming conditions in the presence of a clay catalyst activated with a relatively small but sufficient amount of a phosphoric acid to increase the activity of the catalyst.

EDWIN H. McGREW.